US010303285B2

(12) United States Patent
Dorfner

(10) Patent No.: US 10,303,285 B2
(45) Date of Patent: May 28, 2019

(54) SENSOR DEVICE FOR A DISPLAY

(71) Applicant: Microchip Technology Incorporated, Chandler, AZ (US)

(72) Inventor: Andreas Dorfner, Munich (DE)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 149 days.

(21) Appl. No.: 15/135,347

(22) Filed: Apr. 21, 2016

(65) Prior Publication Data

US 2016/0313852 A1    Oct. 27, 2016

Related U.S. Application Data

(60) Provisional application No. 62/151,201, filed on Apr. 22, 2015.

(51) Int. Cl.
*G06F 3/041* (2006.01)
*G06F 3/01* (2006.01)
*G06F 3/044* (2006.01)

(52) U.S. Cl.
CPC .......... *G06F 3/0416* (2013.01); *G06F 3/017* (2013.01); *G06F 3/044* (2013.01); *G06F 3/0412* (2013.01); *G06F 2203/04101* (2013.01); *G06F 2203/04102* (2013.01); *G06F 2203/04103* (2013.01); *G06F 2203/04108* (2013.01)

(58) Field of Classification Search
CPC ...... G06F 3/0416; G06F 3/0412; G06F 3/017; G06F 3/044; G06F 2203/04102; G06F 2203/04103; G06F 2203/04108; G06F 2203/04101
See application file for complete search history.

(56) References Cited

U.S. PATENT DOCUMENTS

| 5,650,597 | A | * | 7/1997 | Redmayne | ............. G06F 3/044 178/18.06 |
| 2003/0184523 | A1 | * | 10/2003 | Badaye | ............. G06F 3/041 345/173 |
| 2012/0081328 | A1 | * | 4/2012 | Kandziora | ............. G06F 3/0412 345/174 |
| 2013/0176236 | A1 | | 7/2013 | Ivanov | .......................... 345/173 |

OTHER PUBLICATIONS

"MGC3130: Sabrewing Single-Zone Evaluation Kit User's Guide," Microchip Technology Incorporated, 34 pages, © 2013.
International Search Report and Written Opinion, Application No. PCT/US2016/028791, 11 pages, dated Jul. 5, 2016.
European Office Action, Application No. 16720287.8, 5 pages dated Mar. 7, 2019.

* cited by examiner

*Primary Examiner* — Andrew Sasinowski
(74) *Attorney, Agent, or Firm* — Slayden Grubert Beard PLLC

(57) ABSTRACT

A display with an inner visible display area and an outer support area which does not provide a display function is enhanced with an electrode arrangement. The electrode arrangement provides for a substrate layer on which a transmitting electrode is arranged which is surrounded by a plurality of receiving electrodes, wherein at least the transmit electrodes is transparent and at least partially covers the inner visible display area and the receiving electrodes are arranged on portions of the substrate layer covering the outer support area.

19 Claims, 5 Drawing Sheets

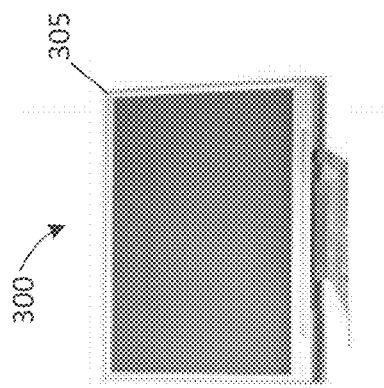
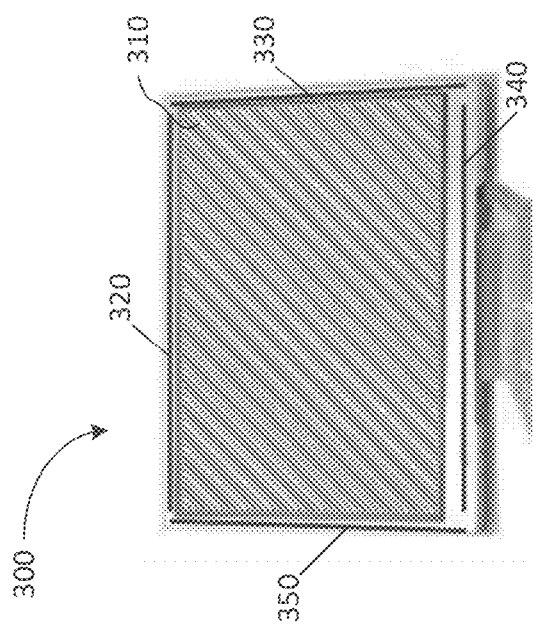

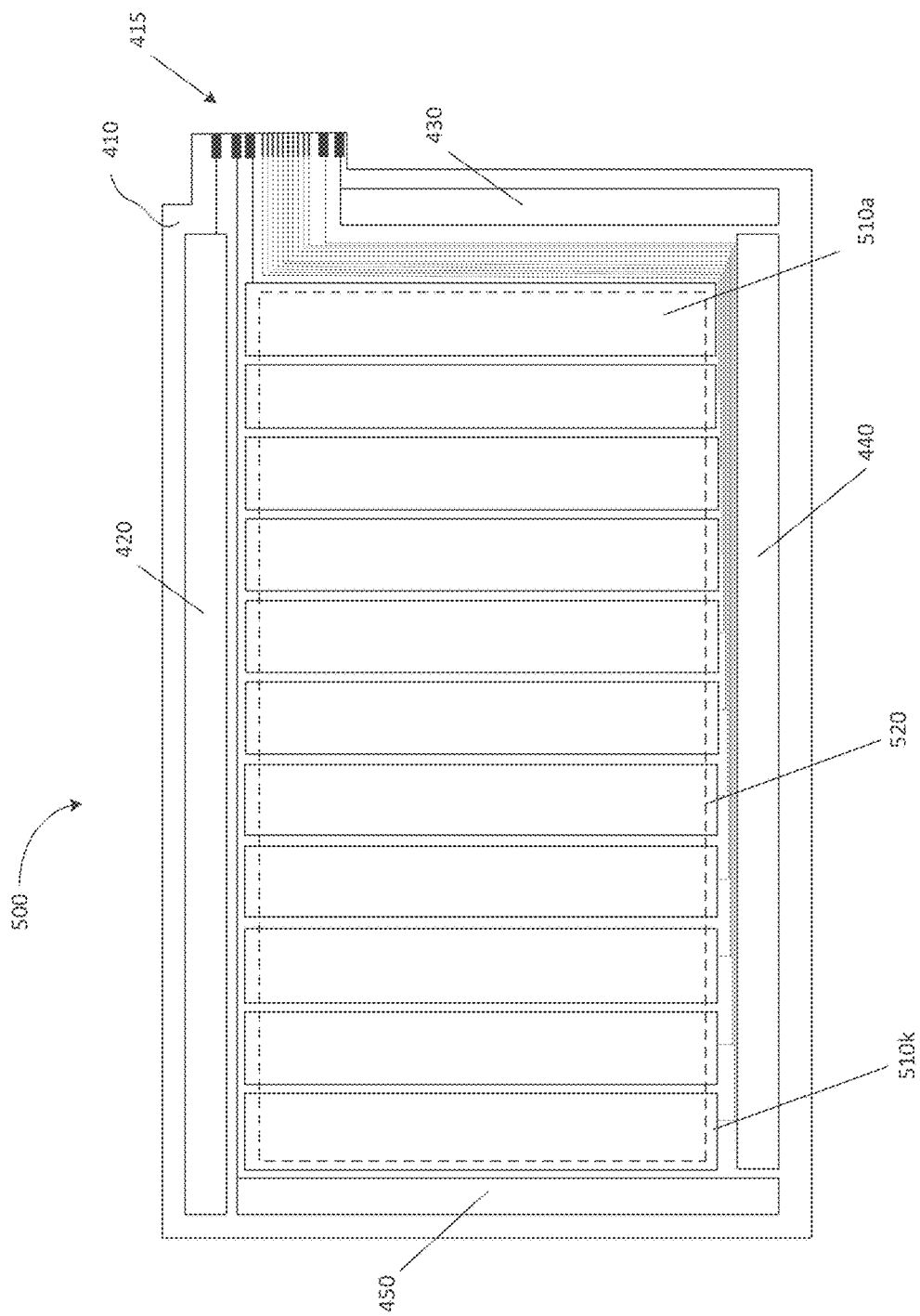

SENSOR DEVICE FOR A DISPLAY

RELATED PATENT APPLICATION

This application claims priority to commonly owned U.S. Provisional Patent Application No. 62/151,201, filed Apr. 22, 2015, which is hereby incorporated by reference herein for all purposes.

TECHNICAL FIELD

The present disclosure relates to capacitive sensor system, in particular for application to displays.

BACKGROUND

Capacitive sensor devices are often implemented in display application such as touch screens. Different sensing technology using mutual and self capacitive sensing are used to detect a touch position. Further developments provide for non-touching input systems that generate an alternating electric near field and measure distortions of such a field with for example, four electrodes arranged in a frame around a display to determine three-dimensional position data of objects entering the field. Such a system is also known as the GestIC® system and has been developed by the assignee of the present application and a general description is for example disclosed in application note "MGC3130—Sabrewing Single-Zone Evaluation Kit User's Guide", published 2013 by Microchip Technology Inc. which is hereby incorporated by reference.

FIG. 1 shows a sensor electrode arrangement 100 as disclosed in FIG. 3-2 of the above mentioned publication. A printed circuit board (PCB) 110 comprises on the top side a plurality of primary receiving electrodes A, B, C, and D arranged in a frame fashion and a center receiving electrode 130. The center electrode may have a hashed structure as shown in FIG. 3-2 of the above mentioned publication. These electrodes are connected with a controller 120 through a respective connector on the PCB or the controller may be arranged on the PCB, whether on the top or the back side. To this end, the PCB can be a dual or multi-layered board and a back side may be used in its entirety as a ground electrode or as a transmission electrode. If it used as a ground electrode with respect to a multi-layer PCB, then any intermittent layer may be used as a transmission electrode wherein the entire layer or parts of it (similar in size as electrode 130) may serve as the transmission electrode. The ground and/or transmission electrode are connected with a controller 120 as indicated with the dashed connection lines. The controller generates a drive signal for the transmission electrode, for example, an alternating square wave- or sinusoidal-signal having a frequency of about 100 kHz. The controller receives signals from the top electrodes A, B, C, D, and 130 and processes these signals to detect gestures performed by an object, for example, a hand or finger, in a detection space above the PCB. Respective commands can then be sent to a host system 140.

SUMMARY

There exists a need for capacitive sensing systems, in particular mutual capacitive sensor systems that provide for example a touch free detection on a commercially available display.

According to an embodiment, an electrode arrangement for display, wherein the display comprises an inner visible display area and an outer support area which does not provide a display function, provides for a substrate layer on which a transmitting electrode is arranged which is surrounded by a plurality of receiving electrodes, wherein at least the transmit electrodes is transparent and at least partially covers the inner visible display area and the receiving electrodes are arranged on portions of the substrate layer covering the outer support area.

According to a further embodiment, the electrodes can be supported by a flexible foil assembly in a single layer. According to a further embodiment, at least the substrate area may comprise the transmitting electrode and the transmitting electrode are transparent. According to a further embodiment, the transmitting electrode may comprise indium tin oxide (ITO). According to a further embodiment, the foil assembly can be adhesive. According to a further embodiment, the foil assembly may comprises a foil laminated with an optical clear adhesive. According to a further embodiment, the transmitting electrode may comprise a plurality of electrode segments. According to a further embodiment, a second layer can be provided comprising sensors for projected capacitance measurement arranged within the inner visible display area. According to a further embodiment, a layer at the back of the substrate may comprise within the outer support area a low impedance conductive material which may be coupled with ground. According to a further embodiment, a layer of low impedance conductive material coupled with ground can be provided under the receive electrodes within the outside support area.

According to another embodiment, a display module can be provided with an electrode arrangement as discussed above, wherein the substrate comprises an adhesive foil assembly which can be attached to a top surface of the display module such that the receiving electrodes are surrounding a display screen of the display module.

According to a further embodiment of the display module, the outer support area can be a metal bezel of the display module coupled with a ground connection of the display module. According to a further embodiment of the display module, a layer at the back of the substrate may comprise within the outer support area a low impedance conductive material which is coupled with a ground connection of the display module. According to a further embodiment of the display module, a non-conductive bezel may cover the outside area of the substrate. According to a further embodiment of the display module, the foil assembly can be flexible and the electrodes are supported by the flexible foil assembly in a single layer. According to a further embodiment of the display module, the foil assembly may comprise a foil laminated with an optical clear adhesive. According to a further embodiment of the display module, at least the substrate area may comprise the transmitting electrode and the transmitting electrode are transparent. According to a further embodiment of the display module, the transmitting electrode may comprise indium tin oxide (ITO). According to a further embodiment of the display module, the foil assembly can be adhesive comprising a foil laminated with an optical clear adhesive. According to a further embodiment of the display module, the transmitting electrode may comprise a plurality of electrode segments. According to a further embodiment of the display module, a second layer can be provided comprising sensors for projected capacitance measurement arranged within the inner visible display area.

According to yet another embodiment, a method for providing a sensor for a display module may comprise the steps of: providing an electrode arrangement according to claim 1, wherein substrate comprises an adhesive foil assembly, and attaching the substrate on top of the display module.

According to a further embodiment of the method, the outer support area can be a metal bezel of the display module. According to a further embodiment of the method, a layer at the back of the substrate may comprise within the outer support area a low impedance conductive material which may be coupled with ground. According to a further embodiment of the method, the method may further comprise mounting a non-conductive bezel over the outside area of the substrate.

BRIEF DESCRIPTION OF THE DRAWINGS

FIG. 3a, shows a conventional LCD module and FIG. 3b shows an application to such a conventional LCD module;

FIG. 5 shows yet another embodiment of a sensor electrode arrangement.

DETAILED DESCRIPTION

According to various embodiments, a true single layer or a multi layer ITO/foil layout can be provided, for example for a GestIC® system for display integration (in particular displays >5"). The combination of 2D and 3D can also be supported. Thus, the sensor system is not limited to three-dimensional gesture detection.

According to various embodiments, sensor sensitivity can be increased by maintaining simple sensor integration in display applications.

The various embodiments can be applied to any display application using, for example, GestIC or the combination of GestIC/PCAP (projected capacitance measurement) as an input method, for example, for 5-17" liquid crystal displays (LCDs).

According to an embodiment, the metal bezel from a display can be used as a shield against noise from the display to the input channels, it is possible to create a true single layer sensor. Thus, according to various embodiments, a 'standard' mutual measurement, for example, with a high voltage drive in the combination with a display can be provided. The various embodiments may apply to different capacitive measurement principles.

Figure 1:
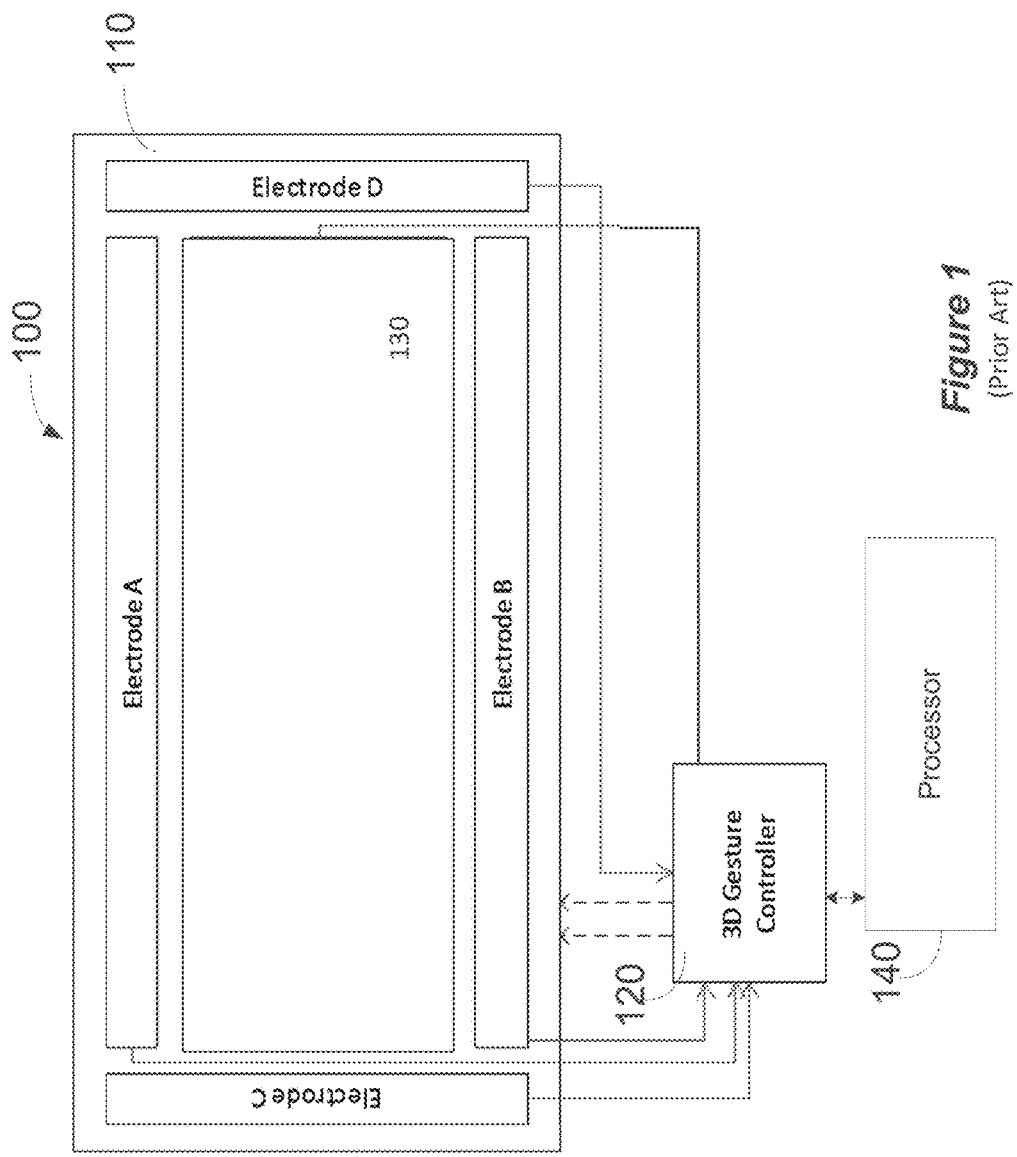
FIG. 1 shows a conventional electrode structure on a PCB for a 3D gesture detection system.
Figure 2:
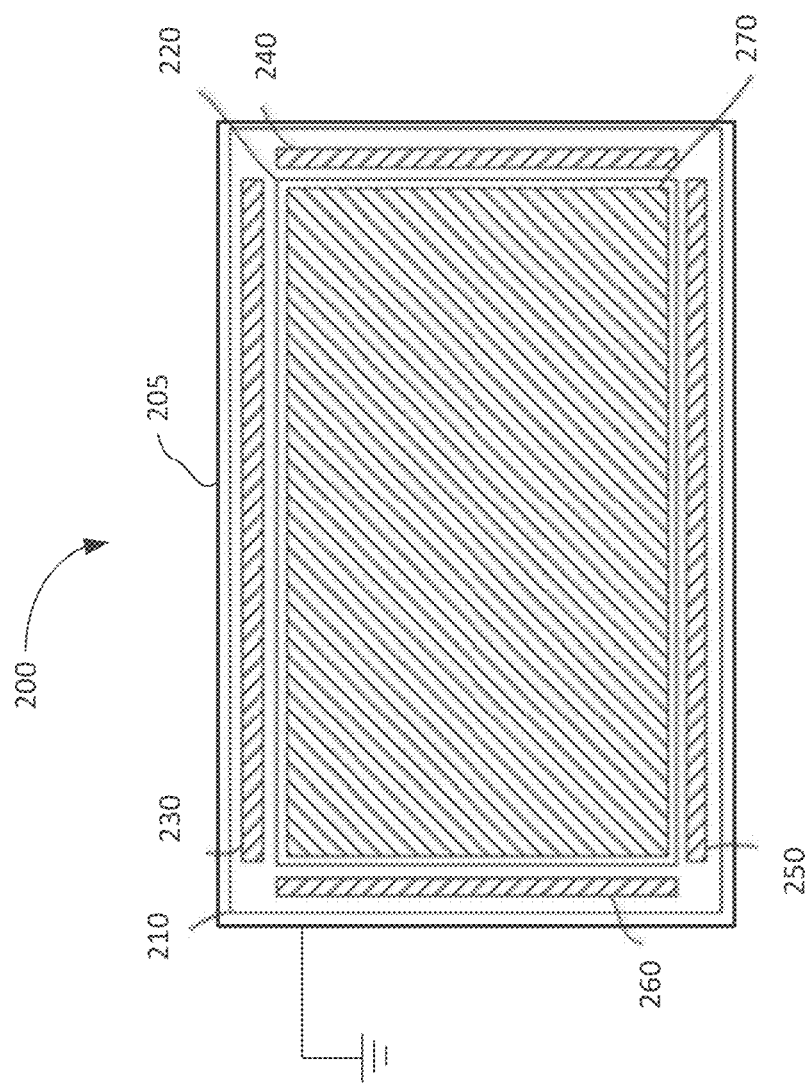
FIG. 2 shows a first embodiment of a sensor electrode arrangement suitable for a display.

FIG. 2 shows the general concept of how the different electrodes can be arranged, for example, within a single layer with respect to a commercially available display 200. Receiving electrodes 230, 240, 250, and 260 are arranged outside the display area 220, for example, placed on the frame formed by a metal bezel 205 of the display 200. Such a sensor may be provided by an adhesive foil assembly 210 that can be applied to the display. The foil assembly may consist of a foil substrate supporting or embedding the electrodes. The foil assembly may be adhesive by adding an optical clear adhesive at the bottom side. The foil assembly may furthermore be flexible. Other foil assemblies providing a similar structure may be used.

The receive electrodes 230, 240, 250, and 260 of high sensitive e-field systems (e.g. GestIC) are very sensitive to noise created by the display, thus it is not possible to place the electrode without a shielding layer directly above the display 200. By moving the receiving electrodes outside the visible area (display), it is possible to integrate the transmit electrode 270 and the receiving electrodes 230, 240, 250, and 260 on a true single layer without any shielding layer. The metal bezel 205 of the display is used for shielding as indicated by the ground connection shown in FIG. 2. If there is no metal bezel available, every other grounded, low impedance conductive material can be used for shielding. For example, a frame shaped metal foil may be applied between the display housing and the electrode foil 210.

The foil 210 as shown in FIG. 2 has a transparent substrate and may comprise transparent electrodes 230, 240, 250, 260 and 270. However, according to some embodiments, only the transmission electrode 270 may be transparent due to the fact that it is the only electrode that covers the visible display area 220. Thus, the transmit electrode 270 will be in the visible area and the receive electrodes 230, 240, 250, and 260 will be in the not visible area of the display 200.

The GestIC integration can be combined with single layer/multilayer projected capacitance (PCAP) solution. To maintain the shielding effect for high sensitive electrodes, the receiving electrodes will stay outside the PCAP receiving electrodes (Rx) area with less sensitive electrodes and the transmission electrodes (Tx) remain in the center. In such an embodiment, the PCAP electrodes are only used for touch detection and associated tracking. The transmission electrode Tx in the center can be shared for PCAP operation and GestIC operation.

FIG. 3a shows a commercially available liquid crystal display module 300 with a metal frame 305 covering the module. An electrical connection in the form of a flexible PCB extends from the bottom area through a recess in the metal frame 305. FIG. 3b shows a hatched center area forming the transmit electrode 310 on the visible screen portion of such a conventional LCD display 300. The transmission electrode 310 can be a single electrode as shown in FIG. 3b or may be segmented into a plurality of transmission electrodes which may during operation of the Gestic system all be connected and receive the same drive signal to effectively operate as a single electrode. Furthermore, surrounding the display, four receiving electrodes 320, 330, 340, and 350 are arranged on the "not visible" or non-display portion of the display 300. This non-display portion is preferable a metal bezel 305 used in many conventional LCD products.

As stated above, the transmission electrode(s) can be shared electrode(s) with 2D system, such as a PCAP system. As mentioned above, the transmission electrodes may be segmented and individually driven for the PCAP system whereas they will be connected to form a single transmission electrode during Gestic operation according to an embodiment. The full display size is thus also usable for touch operation. A Tx drive voltage can be a relatively high voltage for large designs, for example higher than a conventional supply voltage of 3.3-5 Volts. For example, a Tx drive voltage can be about 10-20V.

According to some embodiments, the Rx electrodes are not visible to the user while still arranged in the non-visible display area, for example on the metal bezel of the display module. According to some embodiments, the Rx electrodes can be arranged underneath a non-visible part, for example, the non-visible part of a cover glass. According to some embodiments, the receiving electrodes (Rx) can be on the same ITO/foil layer as the transmission electrode (Tx). According to other embodiments, the receiving electrodes can be above a metal bezel from the display for shielding, wherein the metal bezel is grounded. According to some embodiments, the receiving electrodes can be shielded with a separate layer if no distinct metal frame is provided by the display. According to some embodiments, the Rx electrode can be populated on its own carrier material like rigid/flex PCB.

Figure 4:
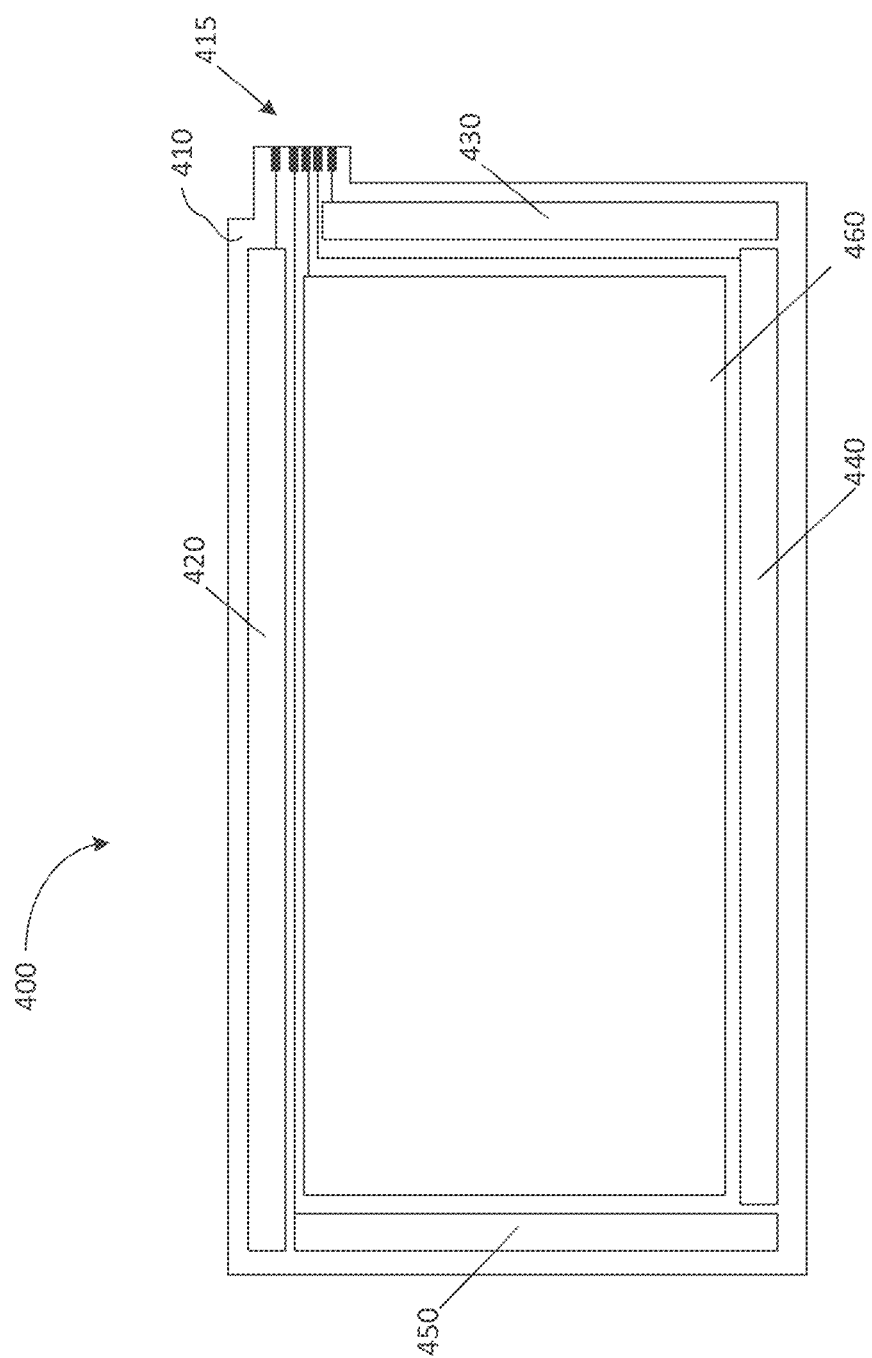
FIG. 4 shows another embodiment of a sensor electrode arrangement.

FIG. 4 shows in the top a single layer example which may be applicable to a commercially available display as shown in the bottom portion of FIG. 3a. A flexible circuit board may be used as a substrate 410. A transparent adhesive layer may be attached at the bottom of the flexible circuit board 410. However, the substrate 410 itself may be a transparent adhesive foil wherein the connector area 415 may be configured non-adhesive. If the transparent foil is adhesive, an optical clear adhesive may be added to the bottom side of the foil. At least the center area intended to cover a display screen may be transparent. However, the entire substrate 410 may be transparent. Receiving electrode 420 extends all the way to the left border. Receiving electrode 450 extends between receiving electrode 420 and the bottom border of the substrate 410. Receiving electrode 430 extend between a connector area 415 and the bottom border of the substrate 410 and receiving electrode 440 extends between receiving electrodes 450 and 430 along the bottom border of the substrate 410. The transmitting electrode 460 fills the entire center area. However, this electrode 460 may also be segmented or have any suitable structural form such as, e.g., hashed. The connector are 415 may be formed by the flexible PCB and may be configured to receive a connector.

FIG. 5 shows another embodiment similar to the embodiment of FIG. 4, wherein similar reference symbols refer to the same elements as shown in FIG. 4. Here, the transmitting electrode 460 is split into a plurality of transmitting electrode segments 510a . . . 510k. Each may be individually connectable through respective feeding lines that are connected with contacts in the connector area 415. Thus, as mentioned above, these segments 510a . . . 510k may be connected together in one operating mode or individually coupled with a generator in another operating mode. FIG. 5 shows an area 520 which may be another layer comprising a plurality of PCAP electrodes to form a touch sensitive sensor area as mentioned above. In the case with an addition layer the receiving electrodes 420 . . . 450 can also be placed on the other layer and not on the same layer as the electrodes 510a . . . 510k.

The invention claimed is:

1. An electrode arrangement configured for attachment to a display, wherein the display comprises an inner visible display area and an outer support area which does not provide a display function, wherein the electrode arrangement only comprises a single electrode layer and provides for a substrate layer on which a transmitting electrode is arranged which is surrounded by a plurality of receiving electrodes in the single electrode layer, wherein at least the transmit electrodes is transparent and at least partially covers the inner visible display area and the receiving electrodes are arranged on portions of the a transparent adhesive foil layer covering the outer support area, wherein the transparent adhesive foil forms the substrate layer.

2. The electrode arrangement according to claim 1, wherein the transparent adhesive foil is a flexible foil.

3. The electrode arrangement according to claim 2, wherein the transmitting electrode comprises indium tin oxide (ITO).

4. The electrode arrangement according to claim 1, wherein the transparent adhesive foil comprises a foil laminated with an optical clear adhesive.

5. The electrode arrangement according to claim 1, wherein the transmitting electrode comprises a plurality of electrode segments.

6. The electrode arrangement according to claim 5, wherein a second layer is provided comprising sensors for projected capacitance measurement arranged within the inner visible display area.

7. The electrode arrangement according to claim 1, wherein a layer at the back of the transparent adhesive foil comprises within the outer support area a low impedance conductive material which may be coupled with ground.

8. The electrode arrangement according to claim 1, wherein a layer of low impedance conductive material coupled with ground is provided under the receive electrodes within the outside support area.

9. A display module with an electrode arrangement according to claim 1, wherein the transparent adhesive foil is attached to a top surface of the display module such that the receiving electrodes are surrounding a display screen of the display module.

10. The display module according to claim 9, wherein the outer support area is a metal bezel of the display module coupled with a ground connection of the display module.

11. The display module according to claim 9, wherein a non-conductive bezel covers the outside area of the transparent adhesive foil.

12. The display module according to claim 9, wherein the transparent adhesive foil is flexible.

13. The display module according to claim 12, wherein the transparent adhesive foil comprises a foil laminated with an optical clear adhesive.

14. The display module according to claim 9, wherein the transmitting electrode comprises a plurality of electrode segments.

15. The display module according to claim 14, wherein a second layer is provided comprising sensors for projected capacitance measurement arranged within the inner visible display area.

16. A method for providing a sensor for a display module comprising the steps of:
providing an electrode arrangement configured for attachment to a display module, wherein the display module comprises an inner visible display area and an outer support area which does not provide a display function, wherein the electrode arrangement only comprises a single electrode layer and provides for a substrate layer on which a transmitting electrode is arranged which is surrounded by a plurality of receiving electrodes in the single electrode layer, wherein at least the transmit electrodes is transparent and at least partially covers the inner visible display area and the receiving electrodes are arranged on portions of the a transparent adhesive foil layer covering the outer support area, wherein the transparent adhesive foil forms the substrate layer, the method comprising:
attaching the transparent adhesive foil on top of the display module.

17. The method according to claim 16, wherein the outer support area is a metal bezel of the display module.

18. The method according to claim 16, wherein a layer at the back of the transparent adhesive foil comprises within the outer support area a low impedance conductive material which may be coupled with ground.

19. The method according to claim 18, further comprising mounting a non-conductive bezel over the outside area of the transparent adhesive foil.

\* \* \* \* \*